(12) United States Patent
Müller et al.

(10) Patent No.: US 6,296,019 B1
(45) Date of Patent: Oct. 2, 2001

(54) PRESSURE MEDIUM SYSTEM

(75) Inventors: Bruno Müller, Bühlertal; Manfred Homm, Bühl-Neusatz, both of (DE)

(73) Assignee: LuK Getriebe-Systeme GmbH, Buhl/Baden (DE)

( * ) Notice: Subject to any disclaimer, the term of this patent is extended or adjusted under 35 U.S.C. 154(b) by 0 days.

(21) Appl. No.: 09/284,316

(22) PCT Filed: Aug. 25, 1998

(86) PCT No.: PCT/DE98/02548

§ 371 Date: Jul. 6, 1999

§ 102(e) Date: Jul. 6, 1999

(87) PCT Pub. No.: WO99/10666

PCT Pub. Date: Mar. 4, 1999

(30) Foreign Application Priority Data

| Aug. 26, 1997 | (DE) | 197 37 022 |
| Aug. 29, 1997 | (DE) | 197 37 782 |
| Sep. 12, 1997 | (DE) | 197 40 151 |
| Oct. 30, 1997 | (DE) | 197 47 924 |
| Jan. 22, 1998 | (DE) | 198 02 212 |

(51) Int. Cl.$^7$ ................................. F16H 61/14

(52) U.S. Cl. ................................. 137/625.66; 137/625.69

(58) Field of Search ........................ 137/625.66, 625.68, 137/625.69

(56) References Cited

U.S. PATENT DOCUMENTS

| 3,267,965 | * | 8/1966 | Kroffke | 137/625.66 X |
| 3,742,980 | * | 7/1973 | Byers et al. | 137/625.69 X |
| 3,985,046 | * | 10/1976 | Morris et al. | 137/625.66 X |
| 4,267,862 | * | 5/1981 | Neff et al. | 137/625.66 X |
| 4,369,677 | * | 1/1983 | Lewis | 137/625.69 X |
| 4,646,785 | * | 3/1987 | Ruedle et al. | 137/625.66 X |
| 5,058,626 | * | 10/1991 | Takaoka et al. | 137/625.66 |
| 5,623,967 | * | 4/1997 | Hayashi | 137/625.66 X |
| 5,924,450 | * | 7/1999 | Sakakibara et al. | 137/625.66 |

* cited by examiner

Primary Examiner—John E. Ryznic
(74) Attorney, Agent, or Firm—Darby & Darby (57) ABSTRACT

The invention relates to a pressure medium system with at least one valve and one pressure medium supply, whereby a differential pressure can be purposely controlled in a positive and negative pressure area, especially for controlling a torque converter lockup clutch of a hydrodynamic torque converter.

17 Claims, 6 Drawing Sheets

PRESSURE MEDIUM SYSTEM

TECHNICAL FIELD

The invention relates to a pressure medium control device for the pressure control of a consumer, with a consumer with a first pressure medium connection and a second pressure medium connection, with a pressure generating device, such as a pump and with a valve for controlling the pressures at the first and second pressure medium connection, wherein the valve has a slider which is axially displaceable inside an oblong hole bore of a housing and is axially displaceable by pressure biasing in a control pressure chamber and against the resetting force of an energy accumulator, wherein furthermore the oblong hole bore has axially spaced indentations provided on the circumference of the bore and each with one or two control edges and the slider has at least a first and a second axially spaced circumferential groove with two control edges.

BACKGROUND OF THE INVENTION

Pressure medium control devices of the generic type are known for controlling a gearbox and a torque converter lock-up clutch of a hydrodynamic torque converter through EP O 293 196. With these pressure medium control devices there is the drawback that when switching on a volume flow change-over for operating the torque converter lock-up clutch with small or negative pressures there is undesired sticking of the clutch. Furthermore with such devices of the generic kind two sliders are used wherein one slider is used for controlling pressure and a second slider is used for changing over the flow.

The object of the invention is to improve a pressure medium control device of the kind mentioned at the beginning with regard to its function whilst nevertheless retaining its simple construction. More particularly the object is to achieve with a device of simple construction of the kind mentioned at the beginning a targeted control of a positive and negative differential pressure as a function of a control pressure. Furthermore the device according to the invention is to be capable of simple fitting and able to be adapted to a variety of individual cases.

SUMMARY OF THE INVENTION

This is achieved according to the invention in that the slider has at its one end area a bore with the diameter $D_3$ which holds an axially displaceable piston and a pressure medium duct between a first circumferential groove of the slider and the bore produces a fluid connection and the slider has, seen perpendicular to the axis of the slider, in the axial direction right and left of the second circumferential groove two different outer diameters $D_1, D_2$ and thus two different cross-sectional surfaces. This avoids an expensive construction with stepped bores with returns which are produced by means of inserted sleeves. Likewise the use of two slider valves is avoided in that the desired function is achieved through the slider of the pressure medium control device according to the invention.

Advantageously the slider has between areas with different outer diameters $D_1$ and $D_2$ a transition area with a differential surface in the area of a control edge of the second circumferential groove with the surface $D_2-D_1$ which is substantially equal to the cross-sectional surface of the bore with the diameter $D_3$. Advantageously the outer diameters $D_1$ and $D_2$ are measured so that the surface difference of the cross-sectional surfaces is equal to the cross-sectional surface of the bore with the diameter $D_3$.

Furthermore the slider advantageously forms between areas with different outer diameters $D_1$ and $D_2$ a transition area with a differential surface in the area of a control edge of the second circumferential groove with the surface $D_2-D_1$ which is substantially larger than the cross-sectional surface of the bore with the diameter $D_3$. Advantageously the outer diameters $D_1$ and $D_2$ are measured so that the surface difference of the cross-sectional surfaces is greater than the cross-sectional surface of the bore with the diameter $D_3$.

Furthermore it is expedient if the slider has between areas with different outer diameters $D_1$ and $D_2$ a transition area with a differential surface in the area of a control edge of the second circumferential groove with the surface $D_2-D_1$ which is substantially smaller than the cross-sectional surface of the bore with the diameter $D_3$. Advantageously the outer diameters $D_1$ and $D_2$ are measured so that the surface difference of the cross-sectional surfaces is smaller than the cross-sectional surface of the bore with the diameter $D_3$.

It is likewise advantageous according to the inventive idea if the slider has a stepped bore arranged coaxial with the axis of the slider and having a first diameter $D_3$ and a second diameter $D_4$ wherein in the area of the second diameter a bore perpendicular thereto produces a fluid connection with the first circumferential groove of the slider.

It is particularly expedient if the oblong hole bore of the valve has a stepped bore with a first diameter $D_1$ and a second diameter $D_2$ wherein the control pressure chamber is located in the end area of the first bore with the smaller diameter. It is likewise advantageous if the oblong hole bore of the valve has a stepped bore with a first diameter $D_1$ and a second diameter $D_2$ wherein an energy accumulator is mounted between the slider and the one end area of the second bore with the larger diameter.

According to the inventive idea it is furthermore advantageous if the energy accumulator is mounted without pretension between the slider and end area of the bore such as wall. In another embodiment it is advantageous if the energy accumulator is mounted with pretension between the slider and the end area of the bore such as wall.

According to a further inventive idea it is expedient if the oblong hole bore has axially spaced indentations provided on the circumference of the bore and at least one of these indentations is connected to an inlet pipe and at least a further of these indentations is connected to an outlet pipe wherein between the inlet pipe and outlet pipe, such as inflow pipe and outflow pipe, is an excess pressure valve which opens in the direction of the outlet pipe when a predetermined excess pressure is reached. It can thereby be advantageous if a throttle is connected in in front of the excess pressure valve.

It is likewise advantageous if the control pressure in the control pressure chamber can be controlled by means of a valve connected in at the input side. In another further development it is expedient if the pressure in the inlet pipe is controllable by means of a valve connected in on the inlet side. It is advantageous if the valves are electrically controllable valves such as magnetic valves. It is further expedient if the valves are controlled by an electronic control unit with a micro processor.

It is further expedient if the oblong hole bore has axially spaced indentations provided on the circumference of the bore and at least one of these indentations is connected to a first pressure medium connection of the consumer and a least one further indentation is connected to a second pressure connection of the consumer.

It is furthermore advantageous if with the pressure medium control device mentioned at the beginning the change-over area of the pressure and the pressure rise can be set independently of the counter pressure which prevails in the outflow pipe. Since the slider regulates or controls the differential pressure it is insensitive to disturbances such as temperature fluctuations particularly at the radiator or pressure fluctuations which occur at the same time at the pressure medium connections of the consumer.

The invention further relates to a pressure medium control device for the pressure control of a consumer, with a consumer having a first pressure medium connection and a second pressure medium connection, with a pressure generating device, such as a pump and with a valve for controlling the pressures at the first and second pressure medium connection, wherein the valve has a slider which is axially displaceable inside an oblong hole bore of a housing and which is axially displaceable by pressure biasing in a control pressure chamber and against the resetting force of an energy accumulator, the oblong hole bore furthermore has axially spaced indentations provided on the circumference of the bore and the slider has at least a first circumferential groove wherein the slider has at its one end area a bore with the diameter $D_{12}$ which holds an axially displaceable piston, and a pressure medium duct between the first circumferential groove of the slider and the bore produces a fluid connection and at the other axial end area of the slider a step is formed which has in the end area of the slider a smaller diameter than in an area remote from the axial end of the slider.

Advantageous developments of the invention are given in the sub-claims which can also be considered inventive per se and will likewise appear from the embodiments shown in the drawings.

BRIEF DESCRIPTION OF THE FIGURES

The invention will now be explained in further detail with reference to the embodiments shown diagrammatically in the drawings in which.

DETAILED DESCRIPTION OF THE PREFERRED EMBODIMENTS

Figure 1:
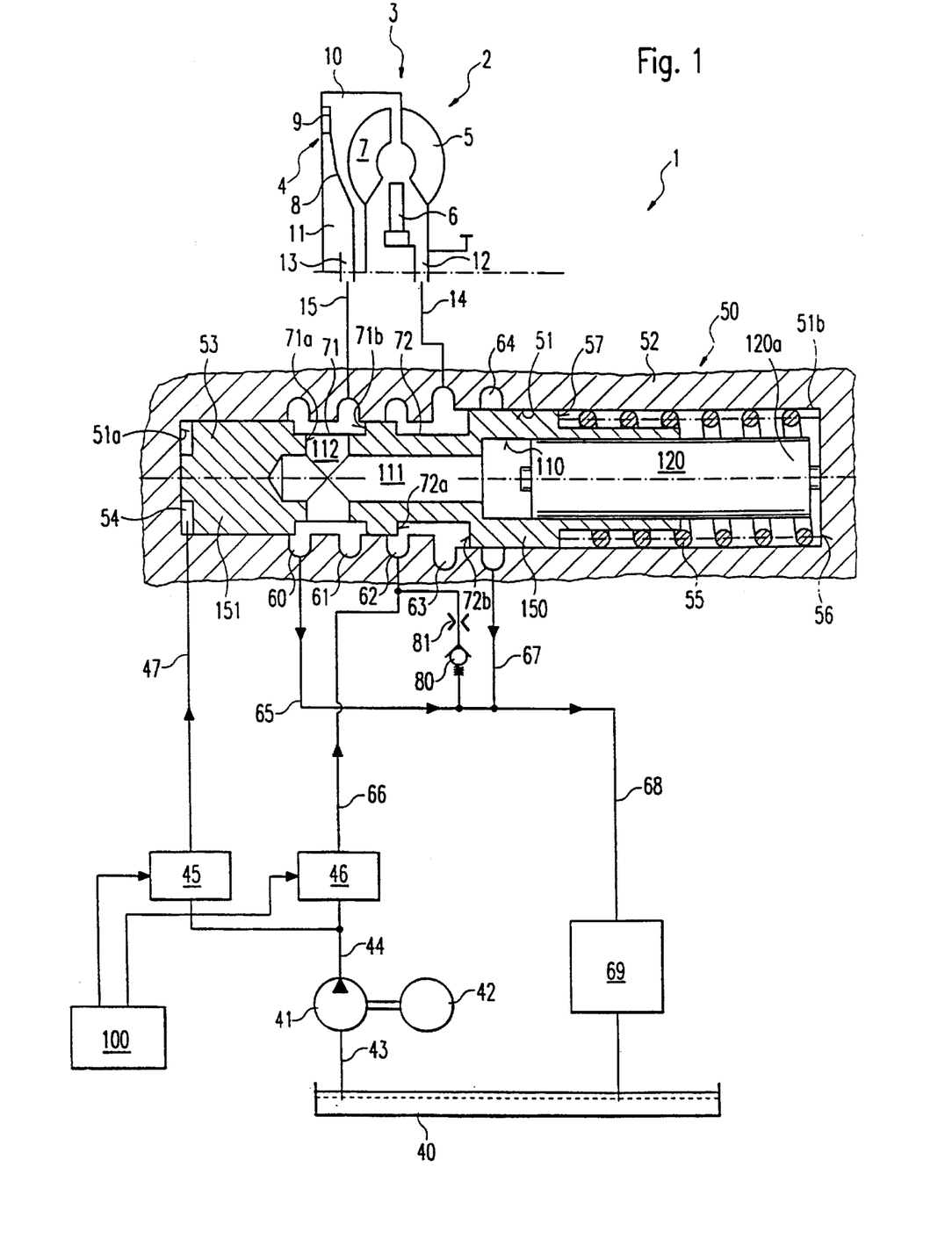
FIG. 1 shows a view of a pressure medium control device.

FIG. 1 shows a pressure medium control device 1 for controlling the pressure of a consumer 2 wherein the consumer is shown as a hydrodynamic torque converter 3 with torque converter lockup clutch 4. The torque converter consists substantially of a pump wheel 5 fixed on the housing, a guide wheel 6 mounted on a shaft by means of a freewheel, as well as a turbine wheel 7. The torque converter lockup clutch has substantially an axially displaceable piston 8 supporting a friction surface 9 wherein friction contact between the friction face 9 and a corresponding counter friction face can be purposely switched on and off through the axial displacement of the piston 8 so that the clutch can be operated fully opened, fully closed or slipping with a speed difference between the friction and counter friction faces.

In order to operate such as switch on or off the torque converter lockup clutch 4 two pressure chambers 10 and 11 are provided each side of the piston and can be biased with pressure medium such as hydraulic fluid. The torque converter lockup clutch is purposely operated by deliberately biasing the pressure chambers 10, 11 with pressure. The pressure chambers 10 and 11 are each in fluid connection with a pressure medium connection wherein one pressure chamber 10 is connected to the first pressure medium connection 12 and the other pressure chamber 11 is connected to a second pressure medium connection 13. The pressure medium connections 12 and 13 are in fluid connection by pressure medium pipes such as hydraulic pipes with a valve 50 connected in on the input side which is used to control the pressures at the pressure medium connections.

The valve 50 has a slider 53 which is axially displaceable inside an oblong hole bore 51 of a housing 52 wherein the oblong hole bore is closed on one side by a closure stopper (not shown). A pressure chamber such as a control pressure chamber 54 is provided at an axial end 51a of the oblong hole bore 51 whereby the pressure biasing of the pressure chamber biases by means of a control pressure the slider 53 inside the oblong hole bore 51 in the axial direction and axially displaces same against the resetting force of an energy accumulator 55. The energy accumulator such as compression spring or elastic element is mounted between a wall 56 of the oblong hole bore 51 in a second end area 51b and a ledge 57 of the slider 53. Advantageously, depending on the embodiment the energy accumulator can be mounted with or without pretension between the radially extending ledge 57 of the slider 53 and the wall 56.

The oblong hole bore 51 furthermore has axially spaced indentations, such as grooves 60, 61, 62, 63, 64 provided on the circumference of the bore. The indentations are in fluid connection with pressure medium pipes 14, 15, 65, 66, 67.

The slider 53 has at least a first and a second axially spaced circumferential groove 70, 71. The circumferential grooves 70, 71 are axially measured so that they connect two of the indentations 60, 61, 62, 63, 64 in dependence on the axial position of the slider 53 and close a connection with each other indentation. This takes place through the position of the control edges 71a, 71b and 72a, 72b of the circumferential grooves 71, 72 of the slider 53 relative to the control edges of the indentations.

Figure 1A:
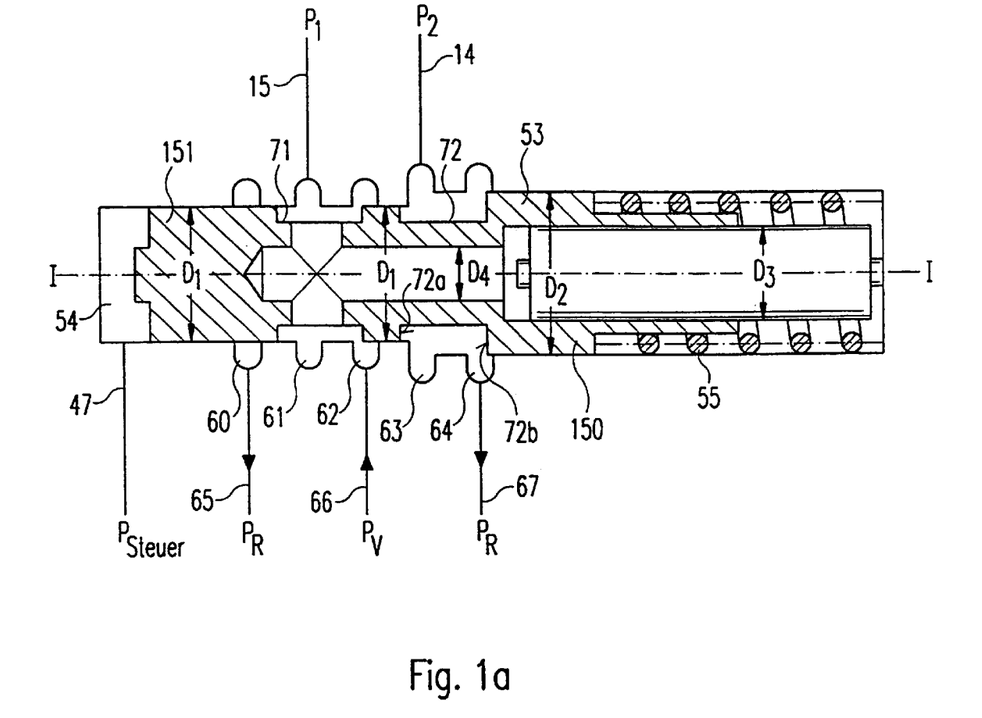
FIG. 1a shows a valve.

In the illustration shown in FIG. 1 the circumferential groove 71 of the slider 53 connects the indentations 60 and 61 and the circumferential groove 72 connects the indentations 62 and 63 whereby the indentation 64 is closed. With a different axial setting of the slider 53 as shown in FIG. 1a the circumferential groove 71 of the slider 53 connects the indentations 61 and 62 and the circumferential groove 72 connects the indentations 63 and 64 whereby the indentation 60 is closed.

In the illustration shown in FIG. 1 the fluid connection through the circumferential groove 71 of the slider 53 between the indentations 60 and 61 has the effect that the pressure medium connection 13 of the consumer is connected by the pipe 15 to the outflow pipe 65 which is connected through the pipe 68 to the radiator 69 and to a sump 40. Furthermore the fluid connection through the circumferential groove 72 between the indentations 62 and 63 has the effect that the pressure medium connection 12 of the consumer is connected by the pipe 14 to the supply pipe 66. The closed indentation 64 is connected to the pipe 67 and to the outflow radiator 69.

Between the supply pipe 66 and the outflow pipe 65 there is furthermore a throttle 81 and an excess pressure valve 80 which opens when the pressure in the supply pipe 66 exceeds a predetermined value.

The supply pipe 66 is supplied through a pump 41 via the pipe 44 whereby the pump 41 is driven by the electric motor 42 and pumps fluid out from a sump 40 through the pipe 43. Between the pump 41 and the pipe 66 is a control valve 46 which likewise controls the system pressure. Furthermore between the pump 41 and the pipe 47 to the control pressure chamber 54 is a valve 45 which determines the control pressure in the chamber 54.

The valves 45 and 46 can be controlled by a control unit 100 such as an electronic control unit with micro processor whereby electrically controllable valves, such as magnetic valves are preferably used as the valves.

By controlling the axial position of the slider 53 the pressures at the first and second pressure medium connection 12, 13 are controlled by means or the pressure generating device 41 such as pump and where applicable with pressure accumulator, and by means of the valve 50.

For the pressure control according to the invention the slider 53 has at its one end area a bore 110 which extends at least in part inside the slider 53 in the axial direction. The bore 110 is preferably mounted coaxial with the axis I-I of the slider 53 and the oblong hole bore 51. An axially displaceable piston 120 is housed inside the bore 110. The piston 120 is supported at its one end area 120a on the corresponding end area of the oblong hole bore.

At the same time a pressure medium duct 111, 112 exists between a first circumferential groove 71 of the slider 53 and the bore 110 which produces a fluid connection inbetween. A pressure force thereby acts on the slider 53 corresponding to the pressure in the area 71 multiplied with the surface of the cross-sectional surface of the bore 110. This force is opposed as rear-acting force to the pressure force on the slider as a result of the control pressure in the chamber 54 and reads as:

$$F_{ruck1} = p_{71} * \pi * (D_3/2)^2$$

with $D_3$ being the diameter of the bore 110.

Furthermore the slider 53 has seen in the axial direction or perpendicular to the axis of the slider right and left of the circumferential groove 72 a different outer diameter. On the right of the control edge 72b the diameter with $D_2$ is larger than the diameter $D_1$ on the left of the control edge 72a. A force action thereby exists on the slider which is directed against the resetting force of the energy accumulator 55. This force action corresponds to the pressure in the area 72 multiplied with the surface difference between the cross-sectional surfaces with different outer diameter and reads:

$$F_{ruck2} = p_{72} * \pi * ((D_2/2)^2 - (D_1/2)^2)$$

with $D_2$ being the diameter of the slider in the area 150 and with $D_1$ being the diameter of the slider in the area 151.

Through a device as described above the differential pressure $(p_1-p_2)$ at the torque converter lockup clutch can be controlled both in the negative pressure area $p_1<p_2$ and in the positive pressure area $p_1>p_2$ purposely as a function of the control pressure $p_{steuer}$ in the area 54. This advantageously has the effect that undesired closing of the clutch through slipping when changing over from a positive pressure area to a negative pressure area does not take place. This can advantageously be reached through a simple construction since the stepped bore 51 with its different diameters can be simply obtained by boring and at the same time the bores 110, 111, 112 can be simply introduced into the slider 53 through boring.

As a result of the above design the slider is responsible both for changing the volume flow at the pressure medium connections 12, 13 and for controlling the engagement state of the converter lockup clutch.

Furthermore it is advantageous if the slider sets a pressure difference $(p_1-p_2)$ independently of the relevant pressure level of the supply pipe $p_v$ and/or the return pipe $P_R$.

Both a proportional valve and a pulse-width modulated valve (PWM valve) can be used to control the differential pressure valve.

The volume flow through the hydrodynamic torque converter is guided both in the opened and in the closed clutch state into the outflow and radiator pipe 68 and is thus used for optimum cooling and lubrication of other component parts in the gearbox.

Figure 2A:
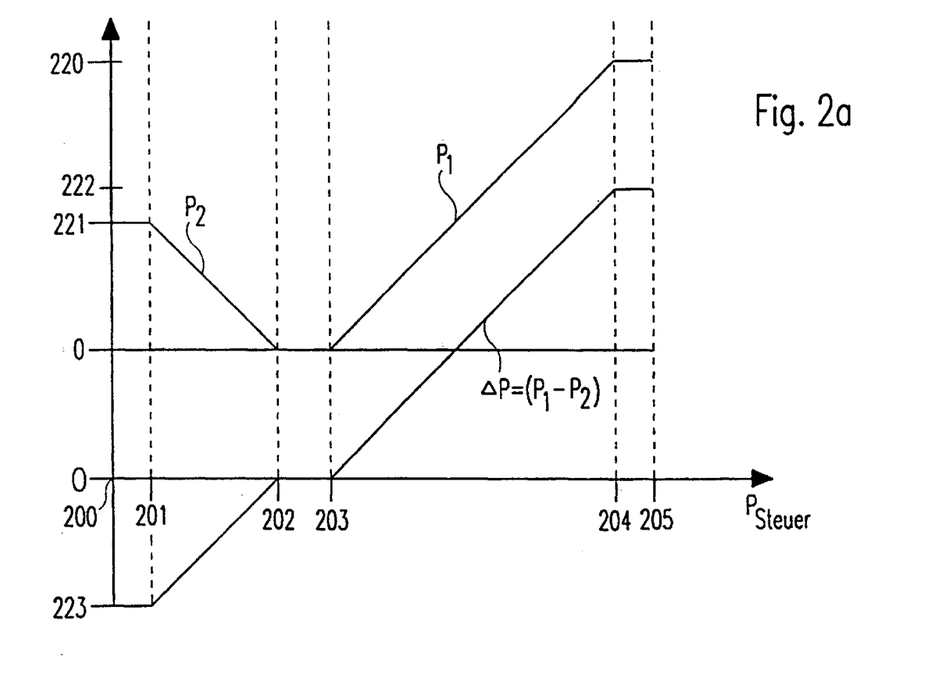
FIG. 2a is a diagram.
Figure 2B:
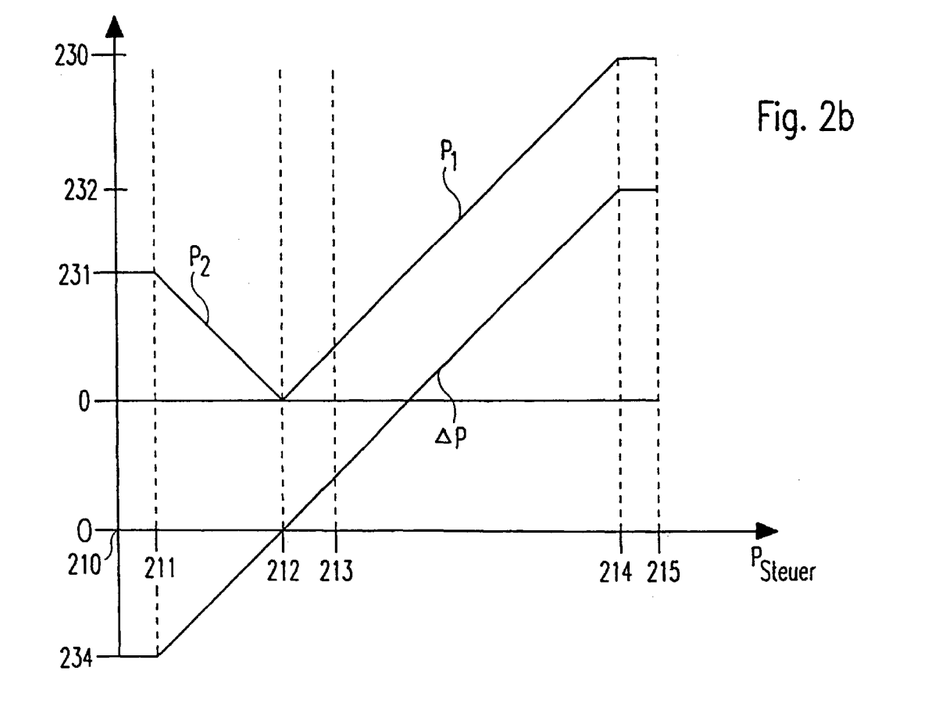
FIG. 2b is a diagram.

FIGS. 2a and 2b show diagrams for illustrating the differential pressure $(p_1-p_2)$ as a function of the control pressure $p_{steuer}$ in the area of the chamber 54. In FIG. 2a the pressure $p_1$ in the area from 200 to 203 is equal to nil and rises from 203 to 204 substantially linearly and is in the area from 204 to 205 constant at a final level, that is it assumes the value 220. The pressure $p_2$ in the area from 200 to 201 is constant at a final level, it assumes the value 221, it drops in the area from 201 to 202 substantially linearly and in the area from 202 to 205 is substantially nil. The pressure difference $p_1-p_2=\Delta p$ is negative in the area from 200 to 201 and constant at the value 223, rises from 201 to 202 to nil, is equal to nil from 202 to 203, rises from 203 to 204 to a value 222 and is constant at the value 222 from 204 to 205.

By reducing the edge overlap of the control edges of the slider and the control edges of the indentations of the oblong hole bore it is possible to reduce the saddle in the switch over area between 202 and 203. This is produced for example with a slider for which the diagram is shown in FIG. 2b.

In FIG. 2b the pressure $p_1$ is equal to nil in area from 210 to 212 and rises substantially linearly from 212 to 214 and is constant at a final level in the area from 214 to 215, that is it assumes the value 230. The pressure $p_2$ in the area from 210 to 211 is constant at the final level, it assumes the value 231, drops substantially linearly in the area from 211 to 212 and is substantially nil in the area from 212 to 215. The pressure difference $p_1-p_2=\Delta p$ is negative in the area from 210 to 211 and constant and assumes the value 234, rises from 211 to 212 to nil, rises from 212 to 214 from nil to a value 232 and is constant at the value 232 from 214 to 215.

Furthermore with the pressure medium control device mentioned at the beginning it is advantageous if the volume flow can be guided through the converter both with an opened and with a closed torque converter lockup clutch into the outflow pipe to the radiator and can thus be used for optimum cooling and lubrication of other gearbox component parts, such as a stepped gearing or continuously variable transmission.

Figure 3:
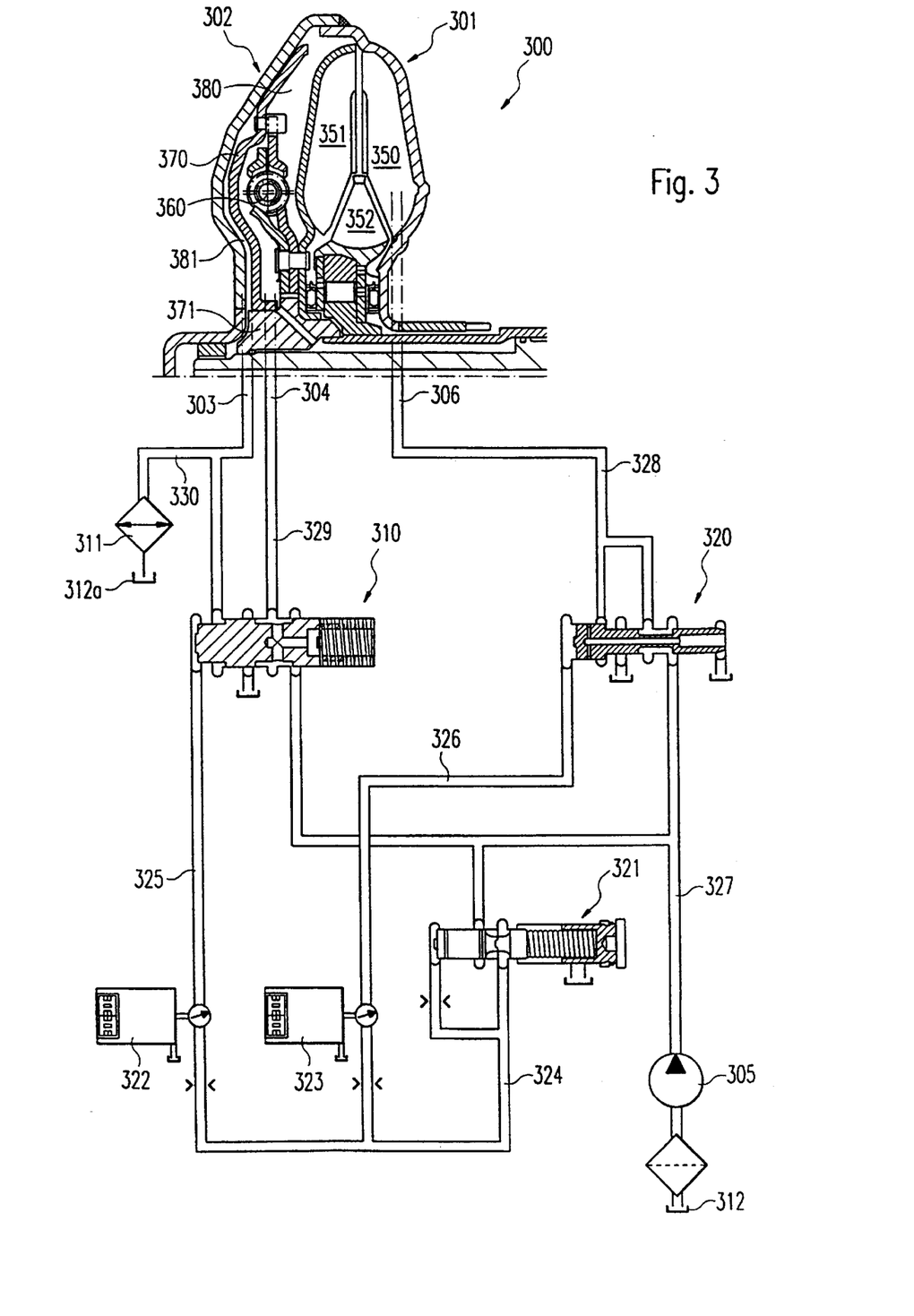
FIG. 3 shows a pressure medium control device.

FIG. 3 shows a pressure medium control device 300 for the pressure control of a consumer, such as for example a hydrodynamic torque converter 301 with a torque converter lockup clutch 302, with a consumer with a first pressure medium connection 303 and a second pressure medium connection 304, with a pressure producing device, such as a pump 305 and with a valve 310 for controlling the pressures at the first and second pressure medium connection 303, 304.

The hydrodynamic torque converter 301 has a pump wheel 350 formed rotationally secured with the housing, a turbine wheel 351 mounted inside the housing, and a guide wheel 352. The piston 370 of the torque converter lockup clutch 302 is mounted inside the space between the turbine wheel 351 and the housing wall on the engine side and divides this spatial area into the pressure chambers 380 and 381. The piston 370 is housed axially displaceable on the hub 371 and can be displaced purposely controlled by the deliberate pressure biasing of the pressure chambers 380, 381 so that the clutch 302 is purposely engaged or disengaged or is controlled slipping or is biased with a pressure difference or the transferable torque is controlled.

The pressure chamber 381 is connected to the pressure medium connection 303 whereby the pressure chamber 380 is connected to the pressure medium connection 304. Furthermore the pressure medium connection 306 exists which supplies the torque converter 301 with pressure medium. This pressure medium such as fluid is fed in at 306 into the flow circuit between the pump wheel, turbine wheel and guide wheel and passes through the radially outer area between the pump wheel and turbine wheel into the pressure chamber of the torque converter lockup clutch and from there radially inwards through the clutch lining (through grooves in the lining) and through a bore in the gear input shaft out from the converter. From there the fluid such as oil flows back through further pipes through the oil radiator into the oil tank. The hydrodynamic torque converter is thus a torque converter with three pressure medium connections which advantageously are formed in the gear input shaft or another shaft or between a pump wheel neck and a guide wheel pipe or between a guide wheel pipe and the gear input shaft. To control the torque transferable by the torque converter lockup clutch the differential pressure is purposely controlled and set between the pressure chambers 380 and 381.

The pressure for controlling and engaging on the torque converter lockup clutch is in one embodiment supplied through the gear input shaft in an axial bore into the pressure chamber between the housing and piston. The clutch then closes when the piston is biased in the direction of the counter friction face of the clutch mounted on the turbine side. Since apart from when engaging the clutch no oil flows, the pressure on the piston of the clutch and in the supply pipes outside of the converter is substantially the same size. An embodiment of this kind is shown in FIG. 4.

Figure 4:
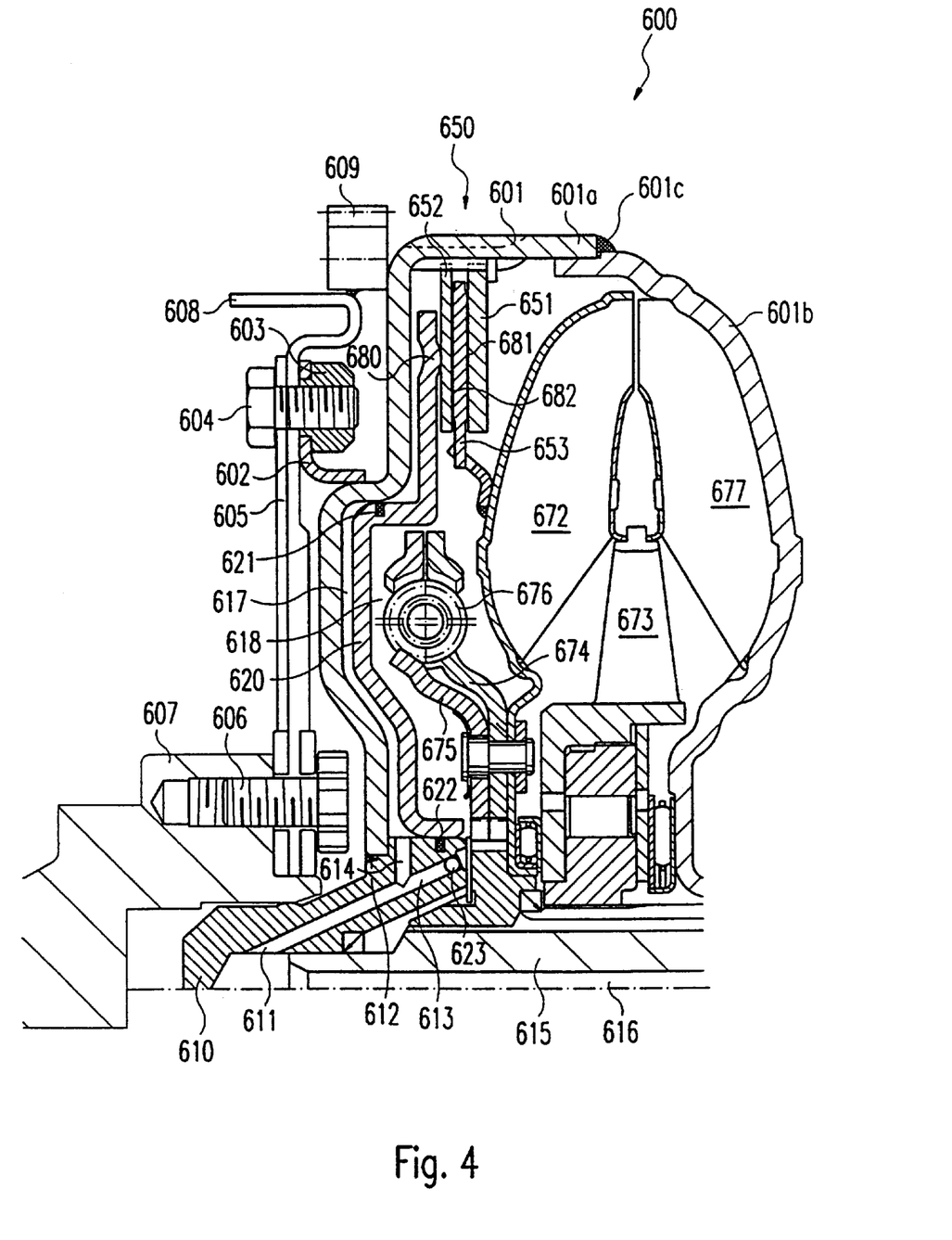
FIG. 4 shows a torque converter.

FIG. 4 shows a further embodiment of the invention whereby the hydrodynamic torque converter 600 is formed with a housing 601 which consists of two housing parts 601a and 601b which are connected together by welding 601c. The housing 601 has deflections 602 from fastening eyes 603 whereby the deflections 602 consist of radially extending tabs. The tabs are preferably welded to the housing. On the drive side the housing 601 is fixed rotationally secured on a flexible drive plate 605 by means of fastening means such as screws or rivets 604. Radially inside on the flexible drive plate this is fixed by fastening means 606 on a crankshaft 607 of an internal combustion engine. A circular ring shaped element 608 is mounted on the radially outer fastening eyes 603 and fixed on same and a starting gear ring 609 is fixed on this element.

A central stud 610 is connected radially on the inside to the housing 601. The stud is connected to the housing by means of welding 612. The stud 610 has channels 611, 613 and 614 wherein the channel 611 which has a radial and an axial extension component is divided in the radially centre area of the stud into channels 614 and 613. The channel 614 has a radial extension component whereby the channel 613 has a radial and an axial extension component. The channels 611, 614 connect the channel 616 provided inside the gear input shaft 615 to the fluid connection with the pressure chamber 617. The pressure chamber 617 is in fluid connection through the channels 611, 616 with a pressure medium supply such as a pump and valves, in order to bias the piston.

The fluid of the pressure chamber is an amount of fluid which does not belong to the flow circuit of the converter in the toroidal area of the turbine wheel, pump wheel and guide wheel and is also not used for cooling the friction faces of the torque converter lockup clutch. This takes place through separating the fluid amounts for the converter circuit and the biasing of the piston.

The pressure chamber 617 is defined by the housing wall 601, the stud 610 and the piston 620 wherein the pressure chamber extends radially between the seals 621 radially outwards between the housing and piston and 622 between the stud and piston. Through the pressure biasing of the pressure chamber 617 the pressure force acts in the axial direction on the piston and this engages the clutch 650. The ball 623 closes the channel 613 so that the pressure medium cannot flow away through the channel 613. The channel 613 is for reasons of manufacture formed in order to be able to produce the channel 611 up to the branch line.

The converter lockup clutch 650 is formed as a multi-plate clutch with the substantially circular ring shaped plates 651, 652 and 653 wherein the two axially outer plates 651 and 652 are connected rotationally secured and in keyed engagement with the housing 601 through radially outer teeth. The plate lying inbetween is connected rotationally secured and in keyed engagement with the turbine wheel radially inwards by a connecting element. The keyed connection between the connecting element and the plate is produced by the teeth in the radially inner area of the plate and by means of teeth on the connecting element. The security ring which is inserted in a circumferential groove of the housing serves as the axial bearing.

The piston 620 has a biasing area 680 which with pressure biasing biases the plate 652. The biasing area 680 is formed substantially as a circular ring shaped area which projects axially from the piston and is made out of the piston by reshaping the material. The biasing area 680 is mounted substantially radially in the middle with the radial extension of the friction linings 681, 682 so that the best possible homogeneous force distribution is produced when biasing the plates. The biasing area 680 is mounted substantially radially outside of the active face of the piston as a boundary face of the pressure chamber 617, thus the biasing area is mounted radially outside of the pressure chamber 617.

The hydrodynamic torque converter 600 furthermore has a turbine wheel 672, a pump wheel 677, a guide wheel 673 and a damper with input and output part 674, 675.

The same applies when controlling a clutch in an embodiment where the oil for controlling the transferable torque of the clutch is introduced into a pressure chamber between the turbine wheel and piston. Then the clutch closes when the piston is biased in the direction of the counter friction face of the clutch mounted on the housing side.

As described above, the pressures for the return $P_{ruck}$ and for the clutch control $P_{kupp}$ are applied outside of the converter and can be guided there through a differential pressure slider 310. In the control position the following applies at the slider:

$$P_{kupp} = k1 * P_{steuer} + P_{ruck} - k2 * F_{feder}.$$

Figure 3A:
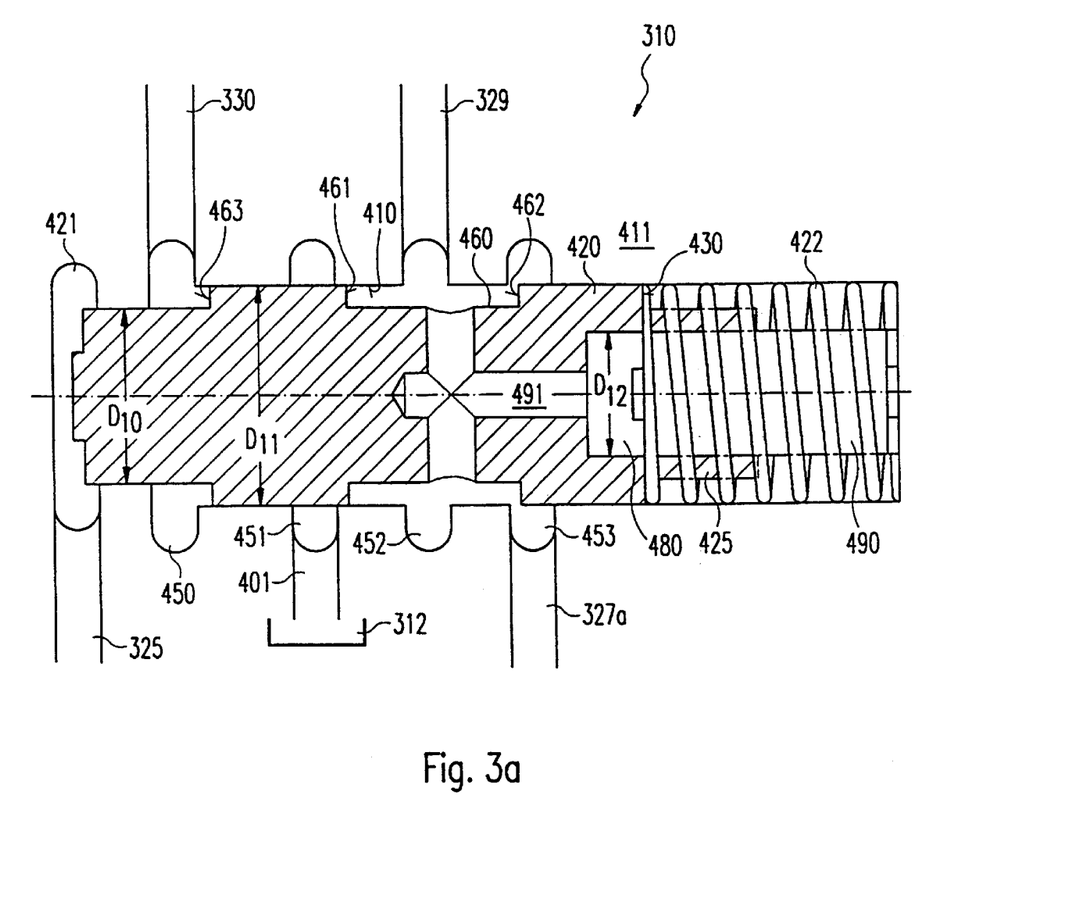
FIG. 3a shows a valve.

Here $P_{kupp} = P_{452}$ is the pressure for biasing the piston of the clutch, k1 a factor, $P_{steuer} = P_{vor}$ the precontrol pressure, $P_{ruck} = p_{450}$ the pressure at the return flow, k2 a factor and $P_{feder}$ a force of the energy accumulator 422. If $P_{ruck}$ fluctuates as a result of for example changes in the build-up pressure, then $P_{kupp}$ is matched accordingly. Thus the set torque which is proportional to the clutch pressure is dependent on the precontrol pressure.

With the two variations of embodiments described above the cooling oil flow can also be reversed. Then the cooling oil supply pressure which has to be guided instead of the return pressure over the differential pressure slider is set on the reverse side of the piston.

The fluid is conveyed by the pump 305 from the sump 312 such as reservoir and supplied to the valves 310, 320 and 321 through the pipe 327 which undertake the pressure or volume flow regulation for pressure biasing for the converter circuit through 306, for the clutch control or for the precontrol pressure adjustment. The pump 305 generates for this the basic pressure in the pipe 327. The valve 321 controls the pressure in the pipe 324 as a basic pressure for the precontrol of the valves 310 and 320. The proportional valves 322 and 323 control the precontrol pressures in the pipes 325 and 326 for the valves 310 and 320. The valve 320 controls in dependence on the precontrol pressure in 326 and the return action of the pressure in the pipe 328 the pressure in the pipe 328. The valve 310 controls the pressure in the pipe 329 in dependence on the precontrol pressure in the pipe 325 and the return action of the pressure in the pipe 330 and the return action of the pressure in the pipe 329.

The proportional valves 322 and 323 are connected in after the valve 321 for preparing the precontrol pressure so that the precontrol pressure of the valve 310 and valve 320 is controlled by same.

FIG. 3a shows the valve 310 in an enlarged section. The valve 310 has a slider 420 mounted axially displaceable inside an oblong hole bore 410 of a housing 411 and displaceable axially by pressure biasing in a control pressure chamber 421 and against the resetting force of an energy accumulator 422. The slider 420 is for this purpose inserted in the oblong hole bore 410 at an axial end of which is mounted the control pressure chamber and which is supplied and pressure biased through the connecting pipe 325 with the pressure medium which is under the control pressure. After the slider 420 has been inserted in the oblong hole bore the energy accumulator 422 and the piston 490 are inserted before the oblong hole bore 410 is closed and substantially sealed by means of a closure or stopper (not shown). The energy accumulator is thereby supported both on an end face 430 of the slider and on an end face of the closure and biases the slider 420 in the direction of the control pressure chamber 421.

In order to secure the energy accumulator 422 abutting against the slider 420 or end face of the slider respectively the slider 420 has a substantially ring-shaped attachment 425 which is expanded in the axial direction and engages radially inside into the energy accumulator. In another embodiment according to the invention this can also be formed so that the attachment engages round the energy accumulator radially on the outside.

The oblong hole bore 410 furthermore has on the circumference of the bore 410 axially spaced indentations 450, 451, 452, 453 and the slider 420 has at least a first circumferential groove 460 which is defined by control edges 461 and 462. Furthermore the slider 420 has at an axial end area opposite the end face for abutting the energy accumulator, a step which means that in the end area of the slider the slider has a smaller diameter $D_{10}$ than in the area remote from the axial end of the slider, there the slider has the diameter $D_{11}$. The step between the diameter area $D_{10}$ and $D_{11}$, thus the edge between the areas can also serve as a control edge 463 in an advantageous embodiment.

Furthermore the slider has at its end area a bore 480 with the diameter $D_{12}$ which holds an axially displaceable piston 490. A pressure medium channel 491 which is formed through an axially aligned bore and a radially aligned bore, is likewise formed in the slider 420 which produces a fluid connection between the first circumferential groove 460 of the slider and the bore 480.

The pressure $p_{450}$ in the chamber 450 produces a setting force $F_{450}$ on the slider which counteracts the resetting force of the energy accumulator. The setting force results from the pressure $p_{450}$ prevailing in the area 450 and the ring surface whose normal points in the axial direction, between the two diameter areas with the diameters $D_{10}$ and $D_{11}$.

There then applies:

$$F_{450}=p_{450}*\pi*((D_{11}/2)^2-(D_{10}/2)^2)$$

Furthermore this setting force is aligned parallel with the setting force $F_{vor}$ as a result of the precontrol pressure $p_{vor}$ in the pressure chamber 421 on the slider 420 with the surface of the end face with the diameter $D_{10}$. Then:

$$F_{vor}=p_{vor}*\pi*(D_{10}/2)^2$$

Furthermore a setting force $F_{452}$ acts on the slider 420 as a result of the pressure $p_{452}$ in the area 452. This pressure $p_{452}$ also prevails inside the bore 480 of the slider 420 and causes a pressure force $F_{452}$ in the axial direction on the slider 420 whereby the pressure force $F_{452}$ acts parallel to the resetting force $F_{feder}$ of the energy accumulator and thus acts against the setting force $F_{vor}$ and $F_{450}$ on the slider as a result of the precontrol pressure and the pressure in the area 450. Then:

$$F_{452}=p_{452}*\pi*(D_{12}/2)^2$$

In a preferred embodiment of the invention the two faces $\pi*(D_{12}/2)^2$ and $\pi*((D_{11}/2)^2-(D_{10}/2)^2)$ are identical. In this case the differential pressure between the pressures at the inlet to the converter and the return to the radiator are proportional to the precontrol pressure, taking into account the spring force. In another embodiment these faces can however also be of different size.

Depending on the position of the piston and the control edges 461, 462 and 463 the axial displacement of the piston causes a connection of the supply pipe 327a or outflow to the sump 312 with the one pressure medium connection 329 for controlling the torque converter lockup clutch. Furthermore in one embodiment the outflow 330 to the radiator can be connected to the sump 312 through the control edge 463.

The advantage of the present valve construction is that with a break in the pressure in the area 330 of the return flow of the radiator a return action takes place on the setting behaviour of the slider and then the slider reduces the pressure in the area 329 because the slider is moved or displaced axially to the left. If however the pressure in the area 330 is increased then the pressure in the area 329 is also increased.

Thus a control of the pressure difference between the pressure in the return flow 330 and the supply 329 thus takes place. This is particularly advantageous if the return build-up pressure in the area 330 changes during operation of the motor vehicle gearbox because the return flowing fluid also serves for example to lubricate or cool gearbox parts, such as clutches, torque sensor or other gears and then during operation of the gearbox time-dependent different operating conditions such as for example other pressures, viscosities or temperatures are then set.

Since the pressure in the return for example to the radiator has an effect on the differential pressure at the converter lockup clutch and thus control state of the torque converter lock up clutch a differential pressure control of the type described above is expedient since then the return action effect described can be reduced or even avoided.

The patent claims filed with the application are proposed wordings without prejudice for obtaining wider patent protection. The applicant retains the right to claim further features disclosed up until now only in the description and/or drawings.

References used in the sub-claims refer to further designs of the subject of the main claim through the features of each relevant sub-claim; they are not to be regarded as dispensing with obtaining an independent subject protection for the features of the sub-claims referred to.

The subjects of these sub-claims however also form independent inventions which have a design independent of the subjects of the preceding claims.

The invention is also not restricted to the embodiments of the description. Rather numerous amendments and modifications are possible within the scope of the invention, particularly those variations, elements and combinations and/or materials which are inventive for example through combination or modification of individual features or elements or process steps contained in the drawings and described in connection with the general description and embodiments and claims and which through combinable features lead to a new subject or to new process steps or sequence of process steps insofar as these refer to manufacturing, test and work processes.

What is claimed is:

1. Pressure medium control device for controlling the pressure of a consumer, with a consumer with a first pressure medium connection and a second pressure medium connection, with a pressure generating device such as a pump and with a valve for controlling the pressures at the first and second pressure medium connection wherein the valve has a slider axially displaceable inside an oblong hole bore of a housing and axially displaceable by pressure biasing in a control pressure chamber and against the resetting force of an energy accumulator, wherein furthermore the oblong hole bore has axially spaced indentations provided on the circumference of the bore and the slider has at least one circumferential groove, wherein the slider has at its one end area a bore with the diameter $D_{12}$ which holds an axially displaceable piston and a pressure medium duct between the first circumferential groove of the slider and the bore produces a fluid connection, and at the other axial end area of the slider is a stepped area which has in the end area of the slider a smaller diameter than in an area remote from the axial end of the slider.

2. Pressure medium control device for controlling the pressure of a consumer with a consumer having a first pressure medium connection and a second pressure medium connection, with a pressure generating device such as a pump, and with a valve for controlling the pressures at the first and second pressure medium connection wherein the valve has a slider axially displaceable inside an oblong hole bore of a housing and axially displaceable through pressure biasing in a control pressure chamber and against the resetting force of an energy accumulator, wherein the oblong hole bore furthermore has axially spaced indentations provided on the circumference of the bore and the slider has at least a first and a second axially spaced circumferential groove, wherein the slider has at its end area a bore with the diameter $D_3$ which holds an axially displaceable piston, and a pressure medium duct between a first circumferential groove of the slider and the bore produces a fluid connection and the slider has in the axial direction on the right and left of the second circumferential groove a different outer diameter $D_1$, $D_2$.

3. Pressure medium control device according to claim 2 wherein the slider forms between areas having different outer diameters $D_1$ and $D_2$ a transition area with a differential surface in the area of a control edge of the second circumferential groove with the surface $D_2-D_1$ which is substantially the same as the cross-sectional surface of the bore with the diameter $D_3$.

4. Pressure medium control device according to claim 2 wherein the slider forms between areas with differential outer diameters $D_1$ and $D_2$ a transition area with a differential surface in the area of a control edge of the second circumferential groove with the surface $D_2-D_1$ which is substantially larger than the cross-sectional surface of the bore with the diameter $D_3$.

5. Pressure medium control device according to claim 2 wherein the slider forms between areas with differential outer diameters $D_1$ and $D_2$ a transition area with a differential surface in the area of a control edge of the second circumferential groove with the surface $D_2-D_1$ which is substantially smaller than the cross-sectional surface of the bore with the diameter $D_3$.

6. Pressure medium control device according to claim 1 wherein the slider has a stepped bore arranged coaxial with the axis of the slider and having a first diameter $D_3$ and a second diameter $D_4$ wherein in the area of the second diameter a bore perpendicular thereto produces a fluid connection with the first circumferential groove of the slider.

7. Pressure medium control device according to claim 1 wherein the oblong hole bore of the valve has a stepped bore with a first diameter $D_1$ and a second diameter $D_2$ wherein the control pressure chamber is located in the end area of the first bore with the smaller diameter.

8. Pressure medium control device according to claim 1 wherein the oblong hole bore of the valve has a stepped bore with a first diameter $D_1$ and a second diameter $D_2$ wherein an energy accumulator is arranged between the slider and the one end area of the second bore having the larger diameter.

9. Pressure medium control device according to claim 8 wherein the energy accumulator is mounted without pretension between the slider and end area of the bore such as the wall.

10. Pressure medium control device according to claim 8 wherein the energy accumulator is mounted with pretension between the slider and end area of the bore such as the wall.

11. Pressure medium control device according to claim 2 wherein the oblong hold bore has indentations provided on the circumference of the bore and spaced out in the axial direction and at least one of these indentations is connected to an inlet pipe and at least one other of these indentations is connected to an outlet pipe wherein an excess pressure valve is mounted between the inlet pipe and outlet pipe and opens in the direction of the outlet pipe when a predetermined excess pressure is reached.

12. Pressure medium control device according to claim 11 wherein a throttle is connected in in front of the excess pressure valve.

13. Pressure medium control device according to claim 2 wherein the control pressure in the control pressure chamber can be controlled by means of a valve connected in on an inlet side.

14. Pressure medium control device according to claim 11 wherein the pressure in the inlet pipe is controllable by means of a valve connected in on an input side.

15. Pressure medium control device according to claim 13 wherein the valves are electrically controllable valves.

16. Pressure medium control device according to claim 15 wherein the valves are controlled by an electronic control unit with a micro processor.

17. Pressure medium control device according to claim 15 wherein the oblong hole bore has indentations spaced out axially on the circumference of the bore and at least one of these indentations is connected to a first pressure medium connection of the consumer and at least one further indentation is connected to a second pressure medium connection of the consumer.

* * * * *